July 22, 1930.  H. A. DANFORTH  1,771,290
SHOCK ABSORBER
Filed Feb. 19, 1924  2 Sheets-Sheet 1
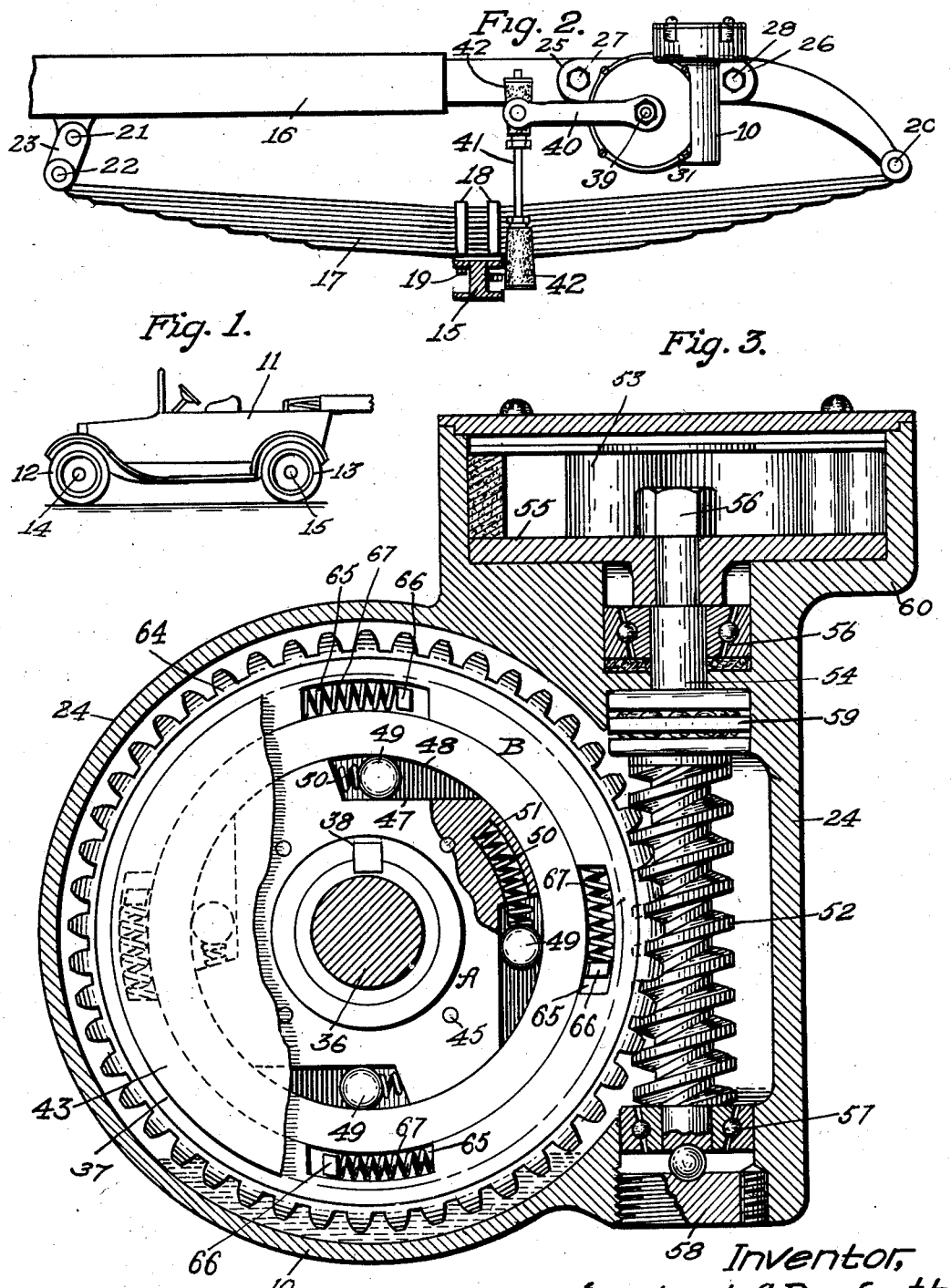
Inventor,
Harland A. Danforth,
by Frank G. Hattie
His Attorney.

July 22, 1930.  H. A. DANFORTH  1,771,290
SHOCK ABSORBER
Filed Feb. 19, 1924   2 Sheets-Sheet 2
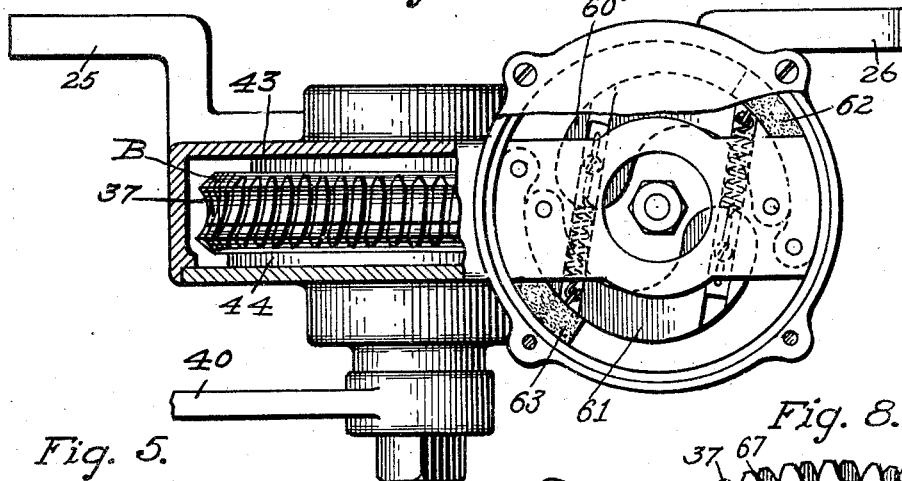
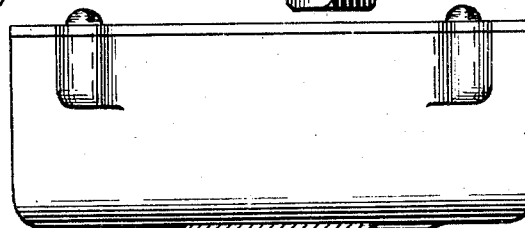
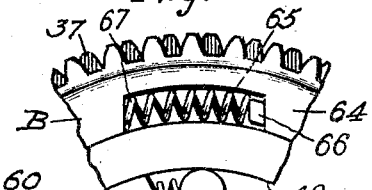
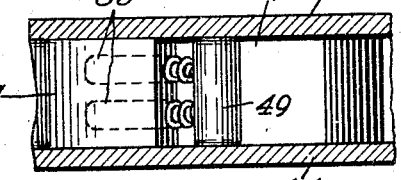
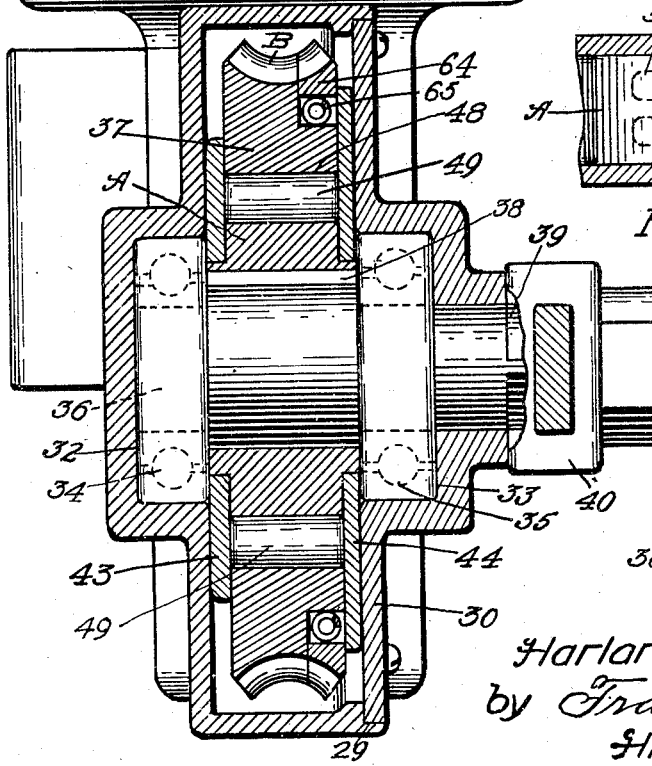
Inventor,
Harland A. Danforth,
by Frank G. Hattie
His Attorney.

Patented July 22, 1930

1,771,290

UNITED STATES PATENT OFFICE

HARLAND A. DANFORTH, OF LYNN, MASSACHUSETTS, ASSIGNOR OF ONE-HALF TO RALPH M. DANFORTH, OF LYNN, MASSACHUSETTS

SHOCK ABSORBER

Application filed February 19, 1924. Serial No. 693,761.

The invention relates to shock absorbers used on vehicles for absorbing the vibration and side thrusts of the said vehicle during travel on the road, whereby the free use of the supporting springs is obtained during the downward thrust of the body, and a regulating device is used for controlling the upward thrust of the body to correct the violent shocks into an easy cushioning movement. The invention is subject to my previous invention disclosed in Patent No. 1,352,724, issued Sept. 20, 1920, for improvements in shock absorbers.

The invention consists of a shock absorber secured to a body and to a flexible support, having a worm wheel driven by the vibration of the vehicle, which meshes with and drives a worm for operating a speed responsive device to control or eliminate the shock or vibration of the vehicle. The invention further consists of an auxiliary gear arrangement which will at all times take up the back lash between the worm wheel and the worm to prevent rattling or offensive noises.

The object of the invention is to provide a practical and durable shock absorber having a speed responsive device for controlling the vibration of the vehicle driven by a simple mechanism which is strong and durable, noiseless, and positive in its action to obtain the best results under the varying conditions of the road.

Other objects and purposes of my invention will appear in the course of the following specification, in which I have shown my invention in concrete form.

In the accompanying drawings illustrating my invention, Fig. 1 is a side elevation of an automobile or vehicle;

Fig. 2 shows the end of one side of the chassis frame with a spring secured thereto with my improved shock absorber connected thereto;

Fig. 3 is a cross section taken in the vertical plane showing the operating members of my improved shock absorber;

Fig. 4 is a plan view with the casing broken away showing the auxiliary gear construction;

Fig. 5 is a section taken on the line 5—5, Fig. 4;

Fig. 6 is a fragmentary section taken on the line 6—6, Fig. 3;

Fig. 7 is a fragmentary section of the gear taken on the line 7—7, Fig. 3; and

Fig. 8 is a fragmentary elevation of part of the gear showing the auxiliary gear construction.

Referring to the drawings, the shock absorber casing 10 is suitably secured to the vehicle having a body 11 of a well known type, supported by the wheels 12 and 13. The wheels are mounted on the axles 14 and 15. The shock absorber can be mounted on either end of the vehicle to absorb the shocks or vibrations of either or both sets of wheels. It is understood that four shock absorbers are used under perfect balancing conditions, but as they are identical in construction, a description of one will be sufficient. Flexibly secured to the axle 15 and chassis frame 16 is a spring 17. The center of the spring 17 is secured to the axle 15 by the straps 18 and held by the bolts 19. The spring is held on its ends to the chassis frame 16 by the pivots 20, 21, 22 and the link 23, which permits a certain flexibility to ease the shock and strains on the vehicle as it passes over uneven places which are common in a highway. To reduce the shocks to a minimum, I have provided an improved shock absorber having certain refinements which are the main embodiment of my invention.

The shock absorber casing 10 is provided with a casing 24, integral with which are the lugs 25 and 26, and is held securely in position by bolts 27 and 28. The casing 24 is provided with a shoulder 29 adapted to receive the oil-tight cover 30. The cover 30 is held to the casing 24 by the screws 31. Cast with the casing 24 and cover 30 are the outwardly extending chambers 32 and 33 adapted to support the ball bearings 34 and 35 which support the shaft 36. Secured to the shaft 36 is the worm wheel 37 which is rigidly held in position on the shaft by the key 38. One end of the shaft 36 extends outside the casing and is provided with a squared end 39 and a nut threaded on the end of the shaft 36 for holding the lever 40 rigidly in position. The lever 40 is connected to the axle 15 by the connecting rod 41, having ball joints 42. The worm wheel 37 is formed into two parts A and B located concentric with each other and held together by the annular plates which permit the member B to remain stationary or rotate with the member A, as the conditions require. To allow the members A and B to work together or independently of each other, a rigid construction is provided consisting of a shoulder formed on the member A adapted to receive the annular plates 43 and 44 which are rigidly secured to the member A by the pins 45. By this construction the members A and B are held in perfect alignment with each other, and at the same time they can operate together by a special mechanism, or the member A can rotate and the member B remain stationary.

To allow these two members to operate together or independently of each other, a special construction is provided, consisting of four flat surfaces 47 formed in the annular member A, which form four depressions covered over by the inner annular surface 48 of the tooth portion of the gear member B. As shown in Fig. 3, one end of the depression narrows down as it approaches the surface 48 of the member B, while the opposite end is large enough to receive the rolls 49 suitably hardened and adapted to wedge between the two surfaces 47 and 48 and drive the members A and B together in one direction, and in the opposite direction the rolls 49 back away from the surfaces which allows the members A and B to act independently of each other, or the member A will rotate while the member B remains stationary. When the member B rotates with the member A, it becomes necessary to insure that the roll 49 will act instantly between the surfaces 47 and 48, and wedge in position. This is accomplished by using springs 50, which rest in the holes 51 drilled in the member A. As the springs 50 extend beyond the holes 51, as shown in Fig. 3, and against the roll 49, the roll is always in position to act instantly. When the member A rotates in the opposite direction, the roll 49 pulls away from the surface by the action of the two members, which tends to move the roll 49 into a position where it will not wedge in position to control the member B and cause it to rotate, thereby permitting the worm 52 to remain stationary during the period when no regulation is required. The gear 37 meshes with the worm 52, which drives the speed responsive device or governor 53 through the shaft 54.

The shaft 54 is held to the governor plate 55 by the nut 56, and rotates with it during the regulating operation. The shaft 54 runs in ball bearings 56 and 57 and step bearing 58, which are adjustably secured to the governor casing 10. The upward thrust of the worm 52 is taken up by a ball bearing 59 and governing casing 60. The governor consists of weights 61 pivotally secured to the plate 55. The weights are responsible to the speed of rotation of the worm wheel 37 and worm 52, which in addition to the centrifugal control acts against the brake shoes 62 and 63, thereby controlling the shocks or vibrations of the vehicle. The worm wheel 37 and worm 52 are provided with teeth cut at the proper angle to allow the worm wheel to mesh with the worm and rotate it without undue wear. While the drawings show a worm gear with a concaved face, it is understood that this is not the only type that can be used. While this form gives strength of tooth, it is the angle of inclination of the threads of the worm that gives the high ratio of speed with a small gear that is important. Any gear which is cut at a proper degree of angle to run with a worm, the shaft of which is approximately at right angles to the shaft of the worm gear, might be used. 52 is to represent a double thread worm ten pitch cut on the same shaft as the governor shaft. It is intended to have the same angle of inclination as a standard quadruple thread worm of said ten pitch, which is about 17°–45′. It is understood that a lower angle of inclination would function in like manner and give a greater ratio of speed; however, it would have to be made with a greater degree of accuracy. While a steeper angle of inclination would be usable and might be desirable, yet it would relatively sacrifice the ratio of speed. In like manner more threads could be used on the worm with a relative sacrifice of the ratio of speed. It is well known that there is a certain back lash between gears and to avoid excessive work in obtaining absolute accuracy between the gear 37 and worm 52 a novel device is provided to eliminate back lash and prevent noise and rattling of the various parts. The device consists of an auxiliary gear arrangement formed on the gear 37. It is understood that various arrangements may be employed whereby the said auxiliary gear may function between the worm and the worm gear. However, the design illustrated in the drawings, has been found to be practical. The rim of the gear 37 is made in two parts and a depression is cut out of the rim of the gear which is adapted to receive a ring 64 having teeth cut on its periphery corresponding to the teeth cut in the gear 37. When the ring is placed in position, it completes the gear. To prevent back lash, the two separate gear constructions are forced away from each other by the action of a spring and take up the back lash between the gear in worm wheel 37 and worm 52. The construction to accomplish this consists of the main gear 37 having a depression cut therein adapted to receive a tooth-ring 64. The tooth-ring 64 is provided with a slot 65. While the gear 37 is provided with a pin 66.

The pin 66 enters into the slot 65 and has a flattened end, against which one end of the spring 67 rests, while the opposite end rests against the end of the slot. By this construction the gear 37 and toothed ring 64 can be forced away from each other the distance from the pin to the end of the slot 65. The springs are held in position by the side plates 43 and 44. When the gear teeth in the worm wheel 37 and ring 64 are placed in mesh with the worm 52, the teeth are brought together in partial alignment, which places the spring 67 under compression, thereby forcing one set of teeth in one direction and the other set of teeth in the opposite direction, and as the two sets of teeth are held in position by the worm teeth there is no chance for any space between the worm and worm wheel teeth, thereby preventing back lash, and it is obvious that if the gear wears or is cut inaccurate, the spring-pressed teeth will always take up the back lash and prevent rattling. It will be noted that the larger section acts as a main gear, that it stands all the strain of the load, that the teeth extend to a point beyond the center of the worm, the better to stand said strain, and that this section alone is in direct contact with the central roller clutch, and through this it communicates with the central shaft. It will also be noted that the smaller gear is an auxiliary gear, that it is mounted upon the main gear section, that it does not carry the load, that it is not in direct communication with the central shaft, and that its sole function is to prevent back lash.

In operation when the vehicle or automobile is passing over an uneven road, the distance between the chassis frame or body 16 and the spring support 17 shortens, at which time the vehicle 11 receives a jolt or vibration, which this invention seeks to rectify and correct with an easy and gradual dissipation of the annoying vibration. The shortening movement between the two members causes the connecting rod 41 and lever 40 to move upwardly, which turn the shaft 36 and cause the member A of the gear 37 to turn. This turning movement allows the rolls 49 to run free of the surfaces 47 and 48 and thereby allowing the member A to run free without imparting a regulating movement to the speed responsive device or governor. This free movement allows the full use of the spring 17 of the vehicle during a downward thrust. The upward movement or the forcing apart of the body 11 and the spring 17 causes the roll 49 to bite against the surfaces 47 and 48 and causes the gear 37 and worm 52 and speed responsive device to rotate, thereby regulating the vibration of the vehicle to the comfort of the riders.

To reduce the number of parts and to stop the rattling and back lash of the gears, the worm wheel 37 drives the worm 52, thereby obtaining a minimum number of parts, and at the same time the auxiliary gear continually takes up the back lash.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. A shock absorber secured to a body and to a flexible support comprising a casing, a speed responsive device forming a part of the shock absorber, a worm wheel rotated by the movement of the body and the flexible support, a shaft mounted in the casing, a worm having teeth of steep inclination mounted on the shaft and driven by the worm wheel which in turn drives the speed responsive device for retarding the vibrations of the body of the vehicle.

2. A shock absorber secured to a body and to a flexible support comprising a casing, a speed responsive device forming a part of the shock absorber, a worm wheel rotated by the movement of the body and the flexible support, a shaft mounted in the casing, a worm having teeth of steep inclination mounted on the shaft and driven by the worm wheel which in turn drives the speed responsive device for retarding the vibrations of the body of the vehicle, and means for rotating the worm wheel, worm and speed responsive device in one direction.

HARLAND A. DANFORTH.